May 27, 1941.  A. R. MUMFORD  2,243,436
METHOD AND APPARATUS FOR TESTING VAPORS AND CONDENSATES
Filed Dec. 15, 1939  2 Sheets-Sheet 1
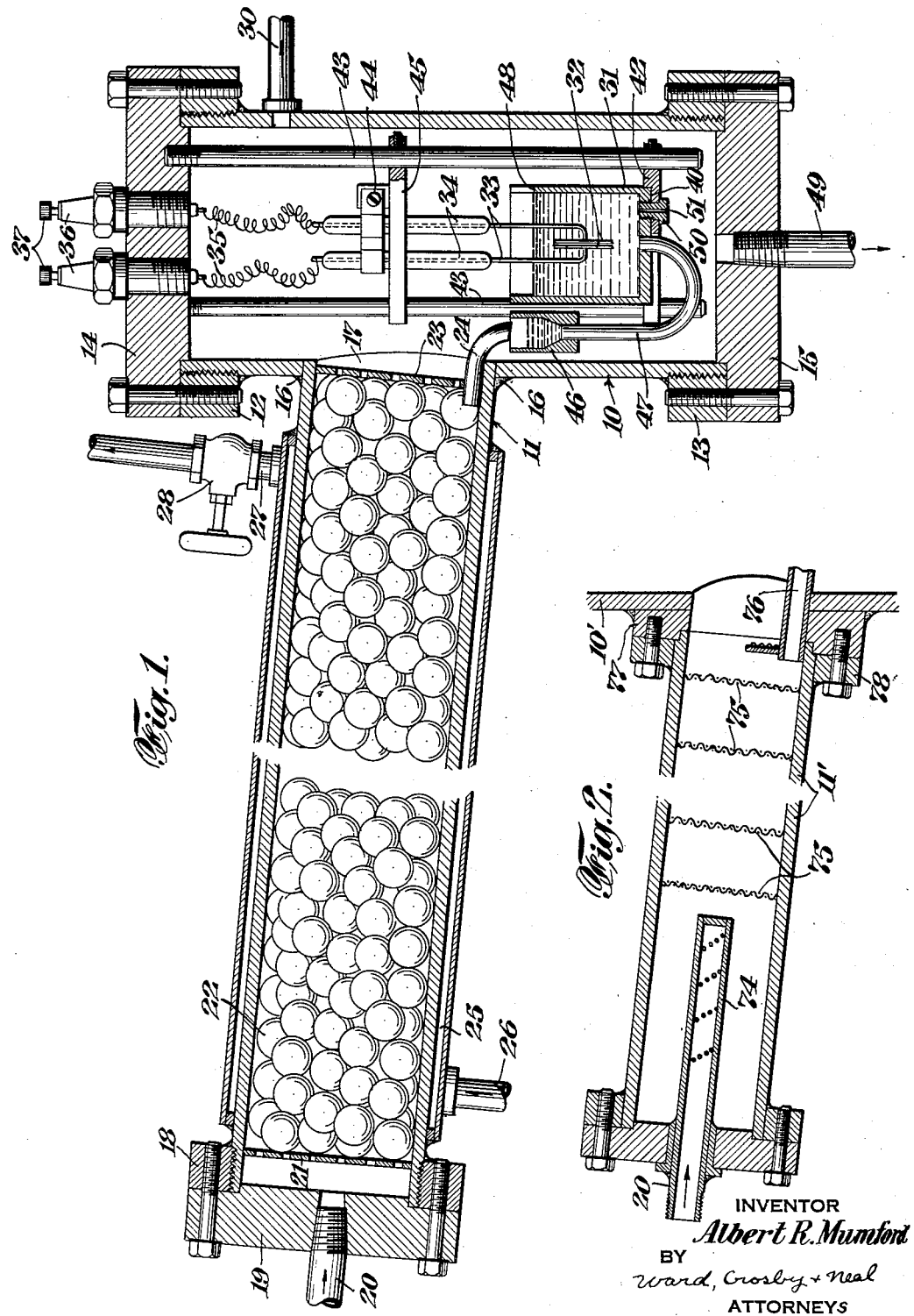
INVENTOR
Albert R. Mumford
BY
Ward, Crosby + Neal
ATTORNEYS May 27, 1941.  A. R. MUMFORD  2,243,436
METHOD AND APPARATUS FOR TESTING VAPORS AND CONDENSATES
Filed Dec. 15, 1939  2 Sheets-Sheet 2
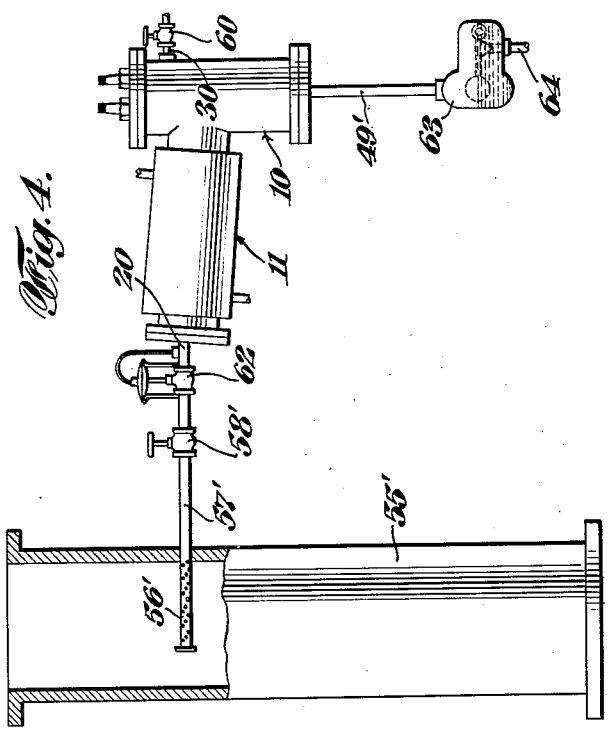
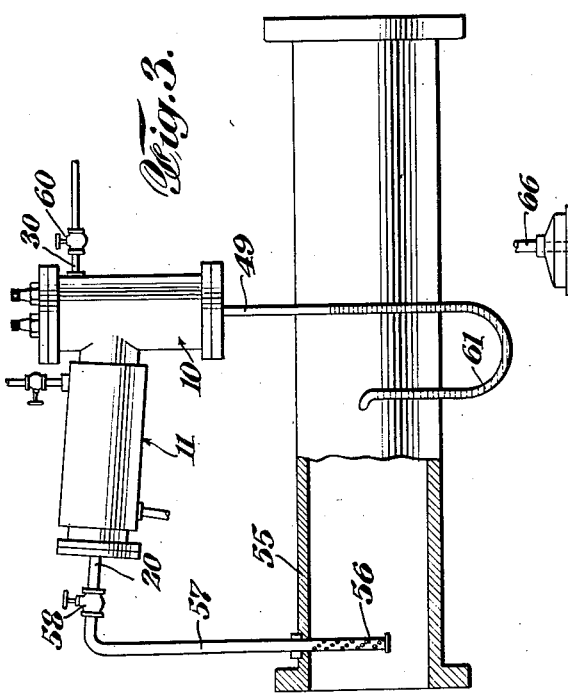
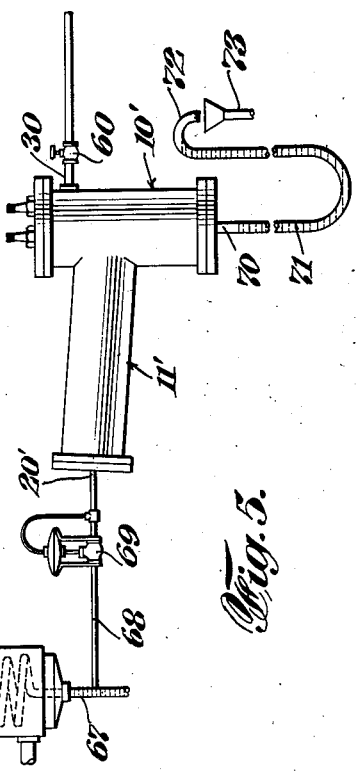
INVENTOR
Albert R. Mumford
BY
Ward, Crosby + Neal
ATTORNEYS Patented May 27, 1941

2,243,436

UNITED STATES PATENT OFFICE 2,243,436

METHOD AND APPARATUS FOR TESTING VAPORS AND CONDENSATES

Albert R. Mumford, Bogota, N. J., assignor to Consolidated Edison Company of New York, Inc., New York, N. Y., a corporation of New York Application December 15, 1939, Serial No. 309,328

15 Claims. (Cl. 175—183)

This invention relates to methods and apparatus for testing vapors such for example as steam, and condensates thereof, to determine the solids content or to indicate when the solids content becomes excessive.

Steam supplies as generated in power plants, often embody a more or less objectionable content of solid matter causing deterioration of the turbines and other equipment through which the steam passes. It is therefore desirable to determine when the solids content becomes serious, so that suitable steps may be taken to correct this condition. While many proposals have been made for measuring the solids in steam, by condensing samples and then measuring the electrical conductivity of the condensate, the methods heretofore proposed have in general been such as to require considerable scientific training or experience in order to carry out the procedure and obtain dependable results, and the apparatus used if adapted to obtain worthwhile results, has been more or less delicate and in the nature of fragile laboratory equipment.

It is also important to measure or test the solids content in the condensates and water supplies at various points in power plants. For this purpose also, proposals have been made for measuring the electrical conductivity of the liquid. For example, in order to determine the leakage in condensers, of cooling water into the steam or condensate, the electrical conductivity of the condensate has sometimes been measured, but the methods and apparatus heretofore available for this purpose have been subject to disadvantages similar to those above indicated as to the testing of steam.

One of the serious problems in measuring the electrical conductivity of condensates or condensed steam samples for the above indicated purposes is that small amounts of gases dissolved in the condensate or other liquid to be tested, will very materially alter its conductivity. Steam supplies may for example contain carbon dioxide in amounts ranging up to in the neighborhood of 17 parts per million, and traces of ammonia or other gases, and when the steam is condensed to measure the conductivity of the condensate, substantial amounts of these gases will be dissolved. The amount of gases present will vary widely and sometimes rapidly, due to operating conditions in the power plant or because of changing weather conditions affecting the water supply. Thus the effect of the gases in the condensate being tested cannot be predetermined or compensated for in advance. Since the amount of solids to be detected or measured may range from only ½ of a part per million, up to 7 or 8 parts per million for example, it will be apparent that unless the effect of the dissolved gases is taken into account, or avoided, the conductivity readings will be valueless to determine the solids content. It will be apparent that exposure of the condensate to the air will also permit sufficient gas to be dissolved to prevent any dependable determination of the conductivity due to solids. In attempts to overcome this problem it has been proposed to introduce samples of steam into an enclosed space wherein all or substantially all of the steam is condensed, the conductivity of the condensate being then measured while attempting to withdraw or discharge the gases from the enclosure. However, with this method since most of the atmosphere above the condensate within the enclosure comprises gas, there will still be some of the gas dissolved, so that after the measurement is made, a sample of the condensate has to be tested by an expert, for its gas content even though the amount of gas is of the order of only one part per million for example. Thereupon one must calculate the corrected conductivity due to solids, by taking into account the amount of gases present in the condensate as measured. Also according to the prior proposals, the condensate was in general at a relatively low and variable temperature as well as being in the presence of the undesired gases at the time the conductivity measurements were made, and for this reason the condensate dissolved an uncertain, variable and troublesome amount of gas.

Since the conductivity of the condensate and the gases dissolved vary substantially with the temperature, it has so far as I am aware, been necessary with prior methods and apparatus to take temperature readings for the condensate simultaneously with the conductivity measurements and with the dissolved gas measurements, in order to be able to calculate corrected measurements, taking into account the temperatures. This has increased the uncertainties and possibilities of error, and required the services of skilled technicians, and precluded the continuous operation of the equipment as a reliable alarm device.

Under the above circumstances the prior apparatus available for the purpose has necessarily been of a laboratory character involving the use of glassware which would be broken if accidentally subjected to high pressures, high temperatures or mechanical injuries.

By the use of the methods and apparatus of the present invention, all of the above mentioned difficulties are substantially eliminated and a rugged device is made available suitable for continuous and dependable use in power plants without requiring the attention of laboratory technicians. A single device is also provided capable of use alternatively, for testing the solids content of steam or other vapor, as well as for determining the solids content of condenser water or other condensates.

Various further and more specific objects, features and advantages will clearly appear from the detailed description given below taken in connection with the accompanying drawings which form a part of this specification and illustrate merely by way of example preferred forms of the apparatus of the invention. The invention consists in such novel features, arrangements and combinations of parts as may be shown and described in connection with the apparatus herein disclosed, and also such novel methods and combinations of method steps as are disclosed and described herein.

In the drawings, Fig. 1 is a vertical sectional view of a preferred embodiment of the apparatus of the invention in a form adapted for testing alternatively, steam or condensates;

Fig. 2 is a view similar to a portion of Fig. 1 but showing an alternative embodiment of the invention more particularly adapted for the testing of condensates;

Fig. 3 is a diagram somewhat schematically illustrating the manner in which a device such as of Fig. 1 may be installed for use in testing the solids content of a high pressure steam supply, wherein the pressure is relatively constant;

Fig. 4 illustrates somewhat schematically, arrangements for connecting a device such as of Fig. 1 for use in testing the solids content of high pressure steam supplies wherein the pressure is fluctuating; and Fig. 5 schematically illustrates an arrangement for connecting devices as of Fig. 1 or 2 for use in measuring the solids content of heater condensate where, for example, the operating pressure of the steam in the heater is above atmospheric pressure.

According to one of the preferred embodiments of this invention a flow of steam to be tested is continuously introduced into a chamber, from which a substantial portion of such steam is continuously discharged or vented, the remainder being condensed on suitable baffle means so engaging the steam flow that substantially all the solids content will be accumulated in the condensate. This condensate while still within the chamber is allowed to run through a conductivity measuring cell and is then discharged in such manner that the relative amounts of vapor and condensate discharged are predetermined or measured. Thus the conductivity measurement for this condensate will bear a predetermined proportional relationship to the conductivity which such condensate would have if all of the entering steam sample were condensed. The chamber is preferably so constructed that it may directly receive high pressure steam without breakage and if the steam supply is at substantially a constant pressure, as will often be the case (although not necessarily so), the pressure within the chamber will be constant and substantially the same as of the steam supply. If the pressure of the steam supply is not constant, it may be kept at a constant predetermined value in the chamber, as by the use of a constant back-pressure valve in the intake. And since the chamber provides for coexistence of the liquid and vapor phases in contact, and in view of the known and constant pressure, the temperature will be predetermined and constant, and equal to the temperature of saturated vapor for said pressure. Hence it will be unnecessary to use any thermometer or equivalent device to determine the temperature at which the conductivity measurement is being made. Another highly advantageous feature of this arrangement resides in the fact that no gases will be dissolved in the condensate in the chamber sufficient to affect the electrical conductivity measurements. This is for the reason that according to Henry's law, at constant temperature, the amount of a gas which will be absorbed by a liquid is directly proportional to the pressure of that gas upon the liquid. And with the above described arrangement, the partial pressure due to the gases in the steam above the condensate in the chamber will be so small that the amount of gas absorbed will be on the order of a millionth of one part per million, and accordingly insufficient to be measured by the measuring apparatus which would ordinarily be used in determining the conductivity of the liquid. Also since the condensate in the chamber will generally be maintained at a relatively high temperature due to the continuous passage of steam through the chamber, further insurance against dissolving of gases in the condensate is provided. In other words, since a substantial portion of the steam is continuously discharged from the chamber without being condensed, the atmosphere within the chamber will be entirely steam except for a few parts per million of gas, and thus the partial pressure of the steam will be relatively great, whereas the partial pressure of the gas will be so extremely small that no gas will be dissolved in the hot condensate sufficient to be measured by ordinary means. On the other hand, in prior apparatus for the purpose, the incoming steam was customarily at a very reduced pressure and was customarily cooled to a point where all or nearly all of the steam was condensed, leaving a relatively cool condensate in the presence of an atmosphere largely made up of gas, whereby an amount of gas was dissolved in the condensate great enough to be of the same order of magnitude as the solids to be measured, thus requiring the procedure of experts to determine the effect of variable amounts of dissolved gases.

Suitable apparatus constructed in accordance with the arrangements generally explained above will now be described in connection with Fig. 1. A chamber is shown at 10 having an extension 11 opening into its side wall, the portion 11 as shown extending in a general horizontal direction, but preferably inclined downwardly somewhat toward the main body of the chamber 10. The chamber 10 may comprise a cylindrical or other tubular member, formed of so-called stainless steel or other suitable material, preferably capable of withstanding high steam pressures and substantially inert in respect to the steam or other fluid to be tested in the device. The inside surfaces at least, of all other parts of the chamber and the parts therein are also preferably formed of the same or other material inert in respect to the fluid to be tested. The tubular portion of chamber 10 may be formed with or welded to suitable flanges as at 12 and 13 at its upper and lower ends respectively, and upon which top and bottom cover plates or walls as at 14 and 15 may be bolted as shown or otherwise secured in sealing relationship to the tubular member. The extension 11 may also comprise a cylindrical or other tubular member secured and sealed as by welding at 16 to the side wall of the main part of the chamber, such side wall at this point having an opening as at 17, preferably of about the same diameter as the internal diameter of the extension 11. The outer end of the extension 11 may be provided with a flange as at 18 upon which an end plate as at 19 may be secured and sealed, as by the bolts shown.

An inlet 20 for the steam or other fluid to be tested may be provided at the outer end of the extension 11. In case the fluid entering this inlet is a flow of steam, the same may first be distributed through a perforated disc as at 21 fitted into the interior of the extension 11. The fluid then passes through numerous tortuous passages which may be formed for example by baffle means preferably comprising a mass of pellets or balls 22 of stainless steel substantially filling the interior of the extension 11. These balls or pellets may be held in place by the perforated disc 21 and another similar perforated disc as at 23 at the inner end of the extension 11.

While passing between and around the balls 22, the fluid is maintained at such a temperature and pressure that the liquid and vapor phases thereof will co-exist in contact. That is, saturated vapor will be passing through the tortuous passages in contact with condensate on the surfaces of the balls. As a result substantially all of the solids content of the fluid to be tested will be accumulated in the liquid on the tortuous passage surfaces. The liquid as it accumulates on these surfaces will run down and collect along the bottom of the extension 11 and may be conducted to the main part of the chamber 10 as through a spout 24. The remaining steam or other vapor and gases will pass through the perforated disc 23 and serve to provide the atmosphere within the main chamber 10.

If the fluid to be tested is in the vapor phase upon entering the inlet 20, it will generally be necessary to provide means for withdrawing heat therefrom as it passes through the extension 11 in order to condense a portion thereof. That is, an amount of heat will have to be withdrawn equivalent to the latent heat of vaporization of the condensate to be formed, plus an amount equivalent to the superheat if any, in the incoming vapor. For this purpose the extension 11 may be surrounded with a suitable cooling jacket. In the particular construction shown this cooling jacket may comprise a cooling fluid cavity as at 25 formed upon or mounted around the extension 11 and having an inlet conduit as at 26 and an outlet conduit as at 27 provided with an adjustable valve 28. The cooling fluid used may comprise a stream of water but it will be apparent that other cooling media may be used if preferred, such as air, gas or other fluid, controlled as by arrangements such as heretofore well known for cooling cylinders and the like. Of course if the apparatus is made large in size, sufficient heat may be radiated therefrom without the use of a cooling jacket. In the particular example shown the rate of withdrawal of heat from the extension 11 may be adjusted by the cooling fluid outlet valve 28, at such a value that a substantial part of the fluid to be tested will be condensed and a substantial part will remain as saturated vapor passing on into the main chamber 10 and vented therefrom through a discharge outlet 30 hereinafter referred to in greater detail. With the apparatus as shown and as generally used, it has been found that the adjustment or regulation of the cooling fluid need not be critical, and satisfactory results may be quickly obtained by trial adjustments.

Within the main chamber 10 a cup for containing a pool of the condensate is shown at 31. A pair of electrodes may be provided as at 32 immersed in this pool for measuring the electrical conductivity thereof. These electrodes may if desired be of standardized type, size and spacing as customarily used for measuring the conductivity of liquids, although preferably with the equipment as shown for testing fluids in power plants, it has been found desirable as a saving of expense to use electrodes formed of stainless steel. These may for example each have an area of 6 square centimeters and be spaced at a distance of 3 millimeters apart, thus giving a "cell factor" of 20 as compared with a standard cell having electrodes of 1 square centimeter, one centimeter apart. These electrodes may be welded or otherwise fixed to stainless steel supporting connections as at 33, extending through insulating rods 34 of glass or fused quartz, and thence to connection wires as at 35 running up to the cover of the device. The electrical connections may be brought through the cover in insulated sealed relationship thereto by means of insulated bushing devices as at 36, which may for example be similar to the construction of spark plugs as used for internal combustion engines. At the exterior of the device, the terminals 37 may be connected to a suitable conductivity measuring apparatus such as an alternating current Wheatstone bridge equipment of well-known type.

The cup 31 may be removably received within a recess 40 formed in a small platform member 42, the latter in turn being supported at an adjustable height on a plurality of posts as at 43 extending down from the cover plate 14. The glass or quartz insulation supports 34 may be clamped to a bracket member 44 which in turn may be secured to another platform member 45 adjustably mounted on the supporting rods 43. Thus the interior parts of the device may be all suspended from or mounted upon the cover and are removable therewith as an assembled unit, for inspection, cleaning, repair or replacement.

The condensate flowing through spout 24 from the extension 11 may be received in a funnel-shaped member 46 mounted on a conduit 47 fixed to, and opening into the bottom of the cup 31. Thus as the fluid to be tested enters the device, condensate is continuously formed, and flows through conduit 47 as a slowly moving stream entering the cup 31 and flowing around and past the surfaces of the electrodes 32 and thence to an overflow weir as at 48. From this overflow the liquid falls to the bottom of the chamber 10 and may be discharged through a condensate outlet as at 49 in various ways, hereinafter explained.

This arrangement provides a pool of the condensate of predetermined size and through which the liquid is continuously flowing in a manner insuring that the electrodes will be enveloped continuously by fresh amounts of liquid entering the pool. Thus as the solids content of the liquid changes, a prompt indication will be given by the electrical measuring equipment, by reason of the consequent changes in electrical conductivity. All other factors will remain substantially constant and predetermined. And access of air to the condensate is prevented at least until after the conductivity is measured.

At the bottom of the cup 31 a removable bushing 50 may be threaded into an opening in the bottom of the cup 31. This may serve to secure the cup in place on the platform 42, and this bushing may also be formed with a very small aperture 51 for draining the cup 31 at times when the apparatus is not connected for use. This aperture is made so small that the cup remains filled and overflowing when the equipment is in use.

If the device of Fig. 1 is to be used for testing a high pressure steam supply wherein the steam supply pressure is relatively constant, it may be connected in a manner somewhat schematically illustrated in Fig. 3. Here a steam line or reservoir is shown at 55 having a sampling nozzle of a suitable well-known type extending therein as at 56 and connected by a conduit 57 through a shut-off valve 58 to the inlet 20. It will be particularly noted that with this arrangement the steam sample is intended to be continuously introduced through the inlet 20 without any substantial reduction in pressure, and the conduit 57 should be large enough to accomplish such purpose whereby the pressure within the chamber 10 and its extension 11 will be substantially the same as in the steam line or reservoir. That is, the shut-off valve here is intended to be used simply to shut off the steam from the apparatus when the latter is not in use, rather than acting as a pressure reducing or throttling device, as used at the corresponding point in apparatus heretofore proposed for the purpose. Since the pressure in the steam line may be readily noted by a steam gauge, and since the pressure in the chamber 10 is substantially the same, the temperature of the condensate within the chamber in the presence of the saturated vapor may readily be determined from steam tables if desired. But since this arrangement is intended to operate with a steam supply of substantially constant pressure, with a consequent substantially constant temperature in the chamber, the conductivity measuring apparatus may be calibrated if desired to take this temperature into account. Hence the operator of the device in the power plant need not be concerned with measuring the temperature of the condensate being tested.

As further shown in Fig. 3, the discharge vent 30 may comprise a small pipe of predetermined size or a pipe provided with an adjustable orifice or valve as at 60 which may be adjusted when the device is installed so as to discharge a predetermined amount of steam per hour when subjected to the pressure existing in the chamber 10. As further shown in Fig. 3, the condensate discharge outlet 49 may comprise a pipe running back and into the high pressure steam line. This pipe is preferably shaped to form a water seal as at 61 of sufficient height to offset the slight difference in pressure between the inlet and outlet pipes of the apparatus arising from resistance to the steam flow. It will be apparent that this arrangement provides a ready means for returning the condensate formed in the apparatus, back into the steam line or reservoir.

Since the amount of steam per hour entering the device through the inlet 20 may be determined from the size of the inlet for the particular pressure in the supply, and the amount of steam vented through the orificed outlet 30 may be similarly determined, the difference between these two values will afford a measure of the amount of condensate discharged per hour through the condensate outlet pipe 49. Hence the ratio of the amount of steam condensed in, and the amount vented from, the device may in effect be predetermined or measured.

As a specific illustrative example of the use of the arrangement of Fig. 3, the steam pressure in the supply main or reservoir may be 1400 pounds per square inch, which steam may be at a temperature for example of about 900° F. The pressure within the device will then be nearly, but slightly below, 1400 pounds per square inch, and the corresponding temperature of the saturated steam within the device will be about 587° F. The vapor inlet may for example be ½", iron pipe size, and the condensate or water outlet ¾", iron pipe size. The vapor outlet or vent may be adjusted or so made as to discharge one-tenth of the steam admitted, while nine-tenths thereof is condensed. Assuming then that the electrical measuring equipment indicates a resistance of 4500 ohms, then this value may be divided by 0.9 to determine the resistance which the condensate would have indicated if the solids were contained in a condensate of all of the introduced steam instead of nine-tenths thereof. In this instance this would give a value of 5000 ohms. Assuming now that it is desired to compute the specific conductance of the condensate as of a temperature of 60° and that the temperature correction is 2% per degree Fahrenheit of increased temperature, and that the "cell constant" is 20, the computations would be as follows for the above example:

5000×20×0.02 (587° F.–60° F.)=1,054,000 ohms specific resistance, or 1/1,054,000, as the specific conductance.

However, these computations are of course unnecessary if it is not desired to numerically express the specific conductance. In the ordinary use of equipment in power plants, the operator need not be concerned with these computations as the procedure would be to instruct the operator that a reading, say of 5000 ohms, would mean that the condition of the steam as to solids content was satisfactory, but that readings of lower values, for example 500 ohms, would show that the solids content was so excessive that steps to remedy the same should be immediately taken.

In addition to the advantages already explained above, of the arrangement of Figs. 1 and 3, it will be apparent that this apparatus makes possible the testing of the steam supply with substantially the minimum possible alteration of its physical characteristics with a consequent avoidance of possibilities of error and inaccuracies in the measurements or tests made. That is, in the prior apparatus for the purpose, the physical characteristics such as pressure and temperature were generally radically altered. For instance the pressure characteristic was altered by a system of throttling valves or by fixed inlet restrictions in the form of small tubes or orifices, whereby the energy represented by the pressure was largely converted into heat at some low pressure, for instance, at or near atmospheric. In fact, such conversion of the pressure energy was necessitated by the use of apparatus such as laboratory glassware which did not have the strength to resist rupture if exposed to the initial pressure. The alteration of the temperature characteristic of the fluid being tested was accomplished by heat exchanging devices, the same or similar to ordinary condensers arranged to cool and either condense all, or substantially all, of the incoming steam sample or an uncertain portion thereof embodying an uncertain portion of the solids content. This change in the temperature characteristic to an uncertain degree necessitated the making of careful temperature measurements with each measurement of the conductivity. On the other hand, with the present invention arranged as in Fig. 3, for example, there need be only a negligible change in the pressure characteristic and the change in the temperature characteristic may be limited to that necessary to eliminate the superheating of the steam, if any, and thus bring its temperature to a predetermined constant value corresponding to the temperature of saturated steam at the pressure prevailing in the device. In other words, the change in the temperature characteristic may be limited to the minimum change necessary to permit the co-existence of the liquid and vapor phases in contact.

For the substantial steam pressures with which this apparatus is most often used, considerable variations in the pressure of the steam supply cause only negligible changes in the corresponding temperatures of saturated steam. This fact further contributes to the accuracy of the tests, despite the avoidance of actual measurements of the temperatures during the tests.

Since all of the parts of the equipment are capable of withstanding any temperatures or pressures available in the steam supply, there is no danger of breakage or injury to the apparatus, however the steam or cooling water inlets or outlets may be adjusted.

If a device such as of Fig. 1 is to be used for testing a high pressure steam supply wherein the pressure fluctuates substantially, it may be connected in a manner illustrated in Fig. 4. Here a steam line or reservoir is shown at 55', having a sampling nozzle as at 56' connected by a conduit 57' through a shut-off valve 58', thence through a constant back-pressure valve 62, to inlet 20. The constant back-pressure valve may preferably be so adjusted that a constant pressure will be maintained within the device 10, 11 as near as possible to the lower limit of the fluctuating pressure in the steam line or reservoir. Accordingly here the construction and operation of the device 10, 11 may be the same or substantially the same as above described and with substantially the same advantages. However, since the condensate discharged through outlet 49' cannot be directly reintroduced into the steam line or reservoir because of the fluctuating pressure, it is desirable in this arrangement to conduct the condensate through a suitable trap as at 63, and thence for disposal through conduit 64.

Fig. 5 illustrates a typical arrangement for the use of the equipment in testing condensates, for example heater condensates where the heater is operating above atmospheric pressure. Here a feed water heater is indicated as at 65 with a steam inlet 66 and condensate outlet 67. Portions of this condensate may be continuously conducted through a pipe 68, a constant back-pressure valve 69, to inlet 20'. The testing device 10', 11' may be of the same construction as above described in connection with Fig. 1 if it is desired to use the same device alternatively for testing steam and condensates. However, in this case it is unnecessary to use a cooling jacket around the extension 11' and if the device is to be used only for testing condensates, the extension 11' may be constructed in accordance with Fig. 2 hereinafter described, with a considerable saving in expense. The condensate outlet 70 as shown in Fig. 5 may preferably be connected to a water sealing device as at 71 having a fixed head of liquid for determining the pressure and hence also the temperature within the testing chamber. The outlet 72 of this sealing device may discharge into a disposal pipe as at 73.

Referring now to Fig. 2, the extension 11' of the testing chamber as here shown may be provided with a perforated inlet nozzle or pipe 74 connected to the inlet 20, whereby the incoming condensate is sprayed or distributed throughout the chamber 11' which acts as an expansion chamber. A plurality of baffles formed for example of open mesh wire screening as at 75 may be provided at spaced points within this chamber as shown, for further distributing the incoming condensate, a portion of which will flash into steam, and the remainder of which may be conducted through a spout as at 76 to the main testing chamber, this spout corresponding in function to the spout 24 in Fig. 1.

The main chamber 10' in the particular form here shown may be formed with a flange as at 77 adapted to be removably bolted to a flange as at 78 on the inner end of the extension 11'. This will readily permit the extension 11' to be used interchangeably with a construction such as shown at 11 in Fig. 1 if desired. While the latter construction may be used for condensate testing, it is unnecessary for such purposes to go to the expense of providing a water jacket or other means for withdrawing heat and it is also unnecessary to provide the stainless steel balls, the latter being replaceable by the less expensive nozzle and baffle means above described, in the case of testing condensates. With the construction of Fig. 2 the main chamber 10' and the operation thereof may be the same as described in connection with chamber 10 of Fig. 1. In both cases it will be noted that the incoming fluid is caused to undergo in part a change of phase, resulting in the coexistence of the liquid and vapor phases in contact at a substantially constant temperature and pressure, and with predetermined relative proportions of liquid and vapor being constantly discharged from the main chamber. Only an indeterminately small amount of the non-condensable gases present as contaminants or impurities will remain dissolved in the condensate within the device. Yet the operation and construction of the apparatus is such that all of the solid or soluble solid constituents will appear in the liquid phase.

As a typical illustrative example of the use of the construction of Fig. 2, the condensate supply pressure may be 200 pounds per square inch at a temperature of 383° F. (5° sub-cooled). This pressure may be reduced by the back-pressure valve, to 6 pounds per square inch corresponding to a temperature of 230.5° F., and whereby the temperature and pressure within the testing chamber are maintained substantially constant at the latter values. The condensate inlet 20' may be ½", iron pipe size, and the condensate outlet ¾", iron pipe size. If it is assumed that the Wheatstone bridge apparatus now indicates a resistance of 8400 ohms, one may readily compute as follows the resistance which would have been indicated had there been no vapor formed and (substantially free of solids) discharged from the testing device. That is, the temperature in the device may be first subtracted from the supply temperature and the result divided by the latent heat of vaporization at 6 pounds pressure, to determine the percentage of the condensate entering the test apparatus which will be vaporized and vented, viz.—

$$\frac{383-230}{958} = .16 \text{ or } 16\%$$

Thus, 16% of the incoming condensate will be vented as vapor and 84% will be discharged as water. Hence—

$$\frac{8400}{.84} = 10,000 \text{ ohms}$$

as the corrected indication. From this figure the specific resistance of the condensate, as of 60° F., may be readily calculated in the same manner as above explained in connection with the test of the steam sample, viz.—

10,000 x 20 x 0.02 (230° F.–60° F.) =
680,000 ohms, specific resistance

Again, these computations need not be made in connection with the ordinary use of the apparatus in power plants and need be considered only if it is desired to express the specific resistance numerically or to originally calibrate the Wheatstone bridge when the apparatus is installed, to directly indicate the specific resistance. The operatives in the power plant using the equipment need only be advised as to which instrument readings indicate that the condensate is in satisfactory or unsatisfactory condition as to solids content.

It will be apparent that the above described equipment may be used for testing steam as well as any of the condensates occurring at various points in power plants, for example, or for testing the solids content of the water within or as fed into an evaporator, the latter being intended in the appended claims to be included under the term "condensates." In the various uses of the equipment in connection with condensates, the same advantages and general principles of operation are available as described above in connection with the testing of steam.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In a method of determining the solids content in a supply of vapor under pressure and containing gas, the steps which comprise continuously introducing some of such vapor into a chamber without materially reducing its pressure, continuously discharging a predetermined percentage of said vapor from the chamber, continuously withdrawing sufficient heat from the chamber to condense the remainder while maintaining the resulting condensate in the chamber at the temperature of said vapor when saturated at said pressure, said temperature and the partial pressure of said gas in the chamber being such that the gas is discharged with the vapor and whereby no gas is dissolved in the condensate sufficient to materially affect its electrical conductivity, conducting said condensate through a pool thereof in the chamber and discharging same at substantially the same rate as formed, and measuring the electrical conductivity of the condensate in said pool.

2. In a method of determining the solids content in a supply of vapor containing gas, the steps which comprise continuously introducing some of such vapor into a chamber under substantial pressure, and through tortuous passages in the chamber, then continuously discharging a predetermined percentage of said vapor from the chamber, continuously withdrawing sufficient heat from the region of the tortuous passages to condense the remainder on the passage surfaces and whereby said solids are accumulated in the condensate, maintaining the resulting condensate while in the chamber at the temperature of said vapor when saturated at said pressure, said temperature and the partial pressure of said gas in the chamber being such that the gas is discharged with the vapor and whereby no gas is dissolved in the condensate sufficient to materially affect its electrical conductivity, conducting said condensate into a pool thereof in the chamber, and measuring the electrical conductivity of the condensate in said pool.

3. In a method of determining the solids content in a supply of vapor under pressure and containing gas, the steps which comprise continuously introducing some of such vapor into a chamber without materially reducing its pressure, and through tortuous passages in the chamber, then continuously discharging a predetermined percentage of said vapor from the chamber, continuously withdrawing sufficient heat from the region of the tortuous passages to condense the remainder on the passage surfaces and whereby said solids are accumulated in the condensate, maintaining the resulting condensate while in the chamber at the temperature of said vapor when saturated at said pressure, said temperature and the partial pressure of said gas in the chamber being such that the gas is discharged with the vapor and whereby no gas is dissolved in the condensate sufficient to materially affect its electrical conductivity, conducting said condensate into a pool thereof in the chamber, measuring the electrical conductivity of the condensate in said pool, and multiplying the result thus obtained, by a fraction corresponding to the fraction of said portion which is condensed in the chamber.

4. In a method of determining the solids content of condensate in the presence of gas normally soluble therein in sufficient amounts to materially alter the electrical conductivity of the condensate, the step comprising measuring the electrical conductivity of the condensate while subjecting same to temperature and pressure conditions insuring coexistence in substantial amounts, of the liquid and vapor phases thereof in contact, and while the partial pressure of the gas is so small as compared with a relatively great partial pressure of the vapor, that the condensate is free of any dissolved gas sufficient to materially affect its electrical conductivity.

5. A method of determining the solids content of condensate in the presence of gas normally soluble therein in sufficient amounts to materially alter the electrical conductivity of the condensate, comprising measuring the electrical conductivity of the condensate while subjecting same to temperature and pressure conditions insuring coexistence of the liquid and vapor phases thereof in contact, while discharging both vapor and liquid in amounts bearing a predetermined or measured relationship, and while the partial pressure of the gas is so small as compared with a relatively great partial pressure of the vapor on the condensate, that the condensate is free of any dissolved gas sufficient to materially affect its electrical conductivity.

6. The method of determining the solids content in heated water containing gas dissolved therein in sufficient amounts to materially alter its electrical conductivity, comprising introducing a stream of the water into a chamber within which the pressure is maintained substantially constant and such that a substantial portion of the water vaporizes in the chamber, measuring the electrical conductivity of the remainder in the chamber, while discharging both vapor and water in amounts bearing a predetermined or measured relationship, whereby the partial pressure of the gas is so small as compared with a relatively great partial pressure of the vapor, that the water in the chamber is made free of any dissolved gas sufficient to materially affect its electrical conductivity.

7. The method of determining the solids content in a steam supply, comprising introducing a flow of the steam into a chamber in which a high pressure is maintained, and through baffle means in the chamber, removing heat from the chamber to condense a sufficient part of such flow on the baffle means to accumulate the solids in such condensate, discharging the remainder of the steam at a rate bearing a predetermined or measured relation to the rate of forming said condensate, and measuring the electrical conductivity of the condensate in the chamber.

8. Apparatus for measuring the solids content of steam comprising a mass of pellets formed of material substantially inert in respect to the steam and providing tortuous passages therebetween, means for enclosing said pellets and for directing the steam through said passages, means for withdrawing heat from the region of said pellets whereby condensate including the solids from the steam, accumulates on the pellets, and means for collecting and measuring the electrical conductivity of such condensate while still enclosed.

9. Apparatus for measuring the solids content of steam or condensate comprising a chamber, means for continuously passing therethrough, condensate and an atmosphere of steam under substantial pressure, and in amounts bearing a predetermined or measured relation, and means for measuring the electrical conductivity of the condensate in the chamber.

10. Apparatus for testing the solids content of steam or condensate comprising a chamber capable of withstanding high steam pressures and formed of material substantially inert in respect to the steam, an extension communicating with said chamber and having an inlet for the fluid to be tested, such extension providing a space adapted for the fluid to partially undergo a change of phase, an electrical conductivity measuring cell in said chamber and means for conducting liquid from said extension into said cell, an orifice for discharging steam from said chamber at a predetermined rate, and means for continuously discharging condensate from said cell and from the chamber.

11. In apparatus for testing the solids content of steam or condensate, the combination of a chamber capable of withstanding high steam pressures and formed of metal substantially inert in respect to steam, a removable cover for said chamber, a cup for containing condensate suspended from said cover, electrodes for determining the electrical conductivity of the condensate within said cup, said electrodes being suspended from said cover, insulated electrical terminals for said electrodes extending through said cover, and means opening into said chamber for introducing an atmosphere of steam therein and for introducing condensate to said cup.

12. Apparatus for testing the solids content of steam or condensate comprising an upstanding tubular chamber capable of withstanding high steam pressures and formed of metal substantially inert in respect to the steam, a removable cover for said chamber, means for determining the electrical conductivity of a body of condensate in said chamber and supported by said cover, and a tubular extension for said chamber inclined toward and opening through a side wall of the chamber, said tubular extension being adapted for the fluid being tested to partially undergo a change of phase and whereby condensate from said extension may run into the chamber, and vapor therefrom may flow into the chamber.

13. Apparatus for testing the solids content of steam comprising a chamber capable of withstanding high steam pressures and formed of a material substantially inert in respect to the steam, means for continuously passing therethrough an atmosphere of steam under pressure, means for continuously passing therethrough a stream of condensate in contact with said steam, means within the chamber for forming a pool of said condensate of predetermined size and through which the stream of condensate flows, and electrodes in said pool with connections running to the exterior of said chamber for measuring the electrical conductivity of the liquid therein.

14. Apparatus for measuring the solids content of steam or condensate comprising an upstanding tubular chamber, an extension for said chamber extending in a generally horizontal direction and opening into a side wall of said chamber, an inlet connection in said extension for the fluid to be measured, baffle means in said extension adapted to facilitate a change of phase of a portion of the fluid in said extension, a conductivity cell in said chamber, means for conducting condensate from said extension into and through said cell, and an orifice communicating with said chamber for discharging steam at a predetermined rate.

15. Apparatus for measuring the solids content of steam or condensate comprising a chamber, means for continuously introducing to said chamber the fluid to be measured and for changing the phase of a portion thereof while maintaining a substantially constant temperature and pressure within the chamber and whereby the atmosphere within the chamber comprises saturated steam, outlet means for said chamber for continuously discharging both steam and condensate, and means within the chamber for measuring the electrical conductivity of the condensate therein.

ALBERT R. MUMFORD.